United States Patent [19]

Uemura et al.

[11] Patent Number: 5,035,849
[45] Date of Patent: Jul. 30, 1991

[54] PROCESS FOR PRODUCING MOLDED ARTICLE USING A RELEASING AGENT

[75] Inventors: Katsuoki Uemura; Masaru Ando; Jun-Ichi Yamauchi, all of Chiba; Yoshinori Akutsu, Kanagawa, all of Japan

[73] Assignee: Chisso Corporation, Japan

[21] Appl. No.: 472,801

[22] Filed: Jan. 31, 1990

[30] Foreign Application Priority Data

Feb. 1, 1989 [JP] Japan .................. 1-23327

[51] Int. Cl.$^5$ .............................................. B29C 33/64
[52] U.S. Cl. ........................... 264/255; 264/300; 264/302; 264/338; 106/38.22; 526/245; 526/279
[58] Field of Search ............... 264/255, 301, 302, 338, 264/300, 213, 331.15; 106/38.22; 427/133, 135; 526/245, 246, 279

[56] References Cited

U.S. PATENT DOCUMENTS

| | | | |
|---|---|---|---|
| 4,082,862 | 4/1978 | Esemplare et al. | 427/133 |
| 4,434,126 | 2/1984 | McGary, Jr. et al. | 264/301 |
| 4,664,864 | 5/1987 | Wersosky | 264/302 |
| 4,673,621 | 6/1987 | Fujiki et al. | 524/544 |

FOREIGN PATENT DOCUMENTS

| | | | |
|---|---|---|---|
| 481025 | 2/1952 | Canada | 264/338 |
| 177647 | 4/1986 | European Pat. Off. | 264/338 |
| 218043 | 4/1987 | European Pat. Off. | 264/302 |
| 60-32611 | 2/1985 | Japan | 264/300 |
| 8800876 | 2/1988 | PCT Int'l Appl. | 264/255 |
| 828977 | 2/1960 | United Kingdom | 264/213 |

Primary Examiner—Jan H. Silbaugh
Assistant Examiner—Catherine Timm
Attorney, Agent, or Firm—Leydig, Voit & Mayer

[57] ABSTRACT

A process for producing a molded article is provided including a) The surface of a mold is cooled with a releasing agent for powder molding which has, as an essential component, a copolymer AB derived from at least one monomer A represented by the following general formula (I)

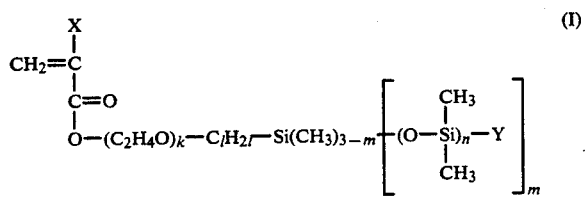

wherein X is a hydrogen atom or a methyl group, k is an integer of 0–5, l is an integer of 1–3, m is a integer of 1–3, n is an integer of 0–550 and Y is a methyl group or a fluorine atom-containing substituent having 1–20 carbon atoms, and at least one vinyl-polymerizable monomer B containing at least one alkyl acrylate or alkylmethacrylate wherein the alkyl group has 1 to 8 carbon atoms.

b) The coated mold is heated.

c) A powder of a non-rigid vinyl chloride resin containing a plasticizer is allowed to adhere to the heated mold to melt the powder.

d) The mold, releasing agent and powder are cooled to form a molded article.

e) The molded article is peeled from the mold. Monomer A and monomer B are combined in proportions within the copolymer AB such that the film of releasing agent has good compatibility with the vinyl chloride resin and sufficient releasability from the mold such that the film migrates to the surface of the molded article at the time of peeling.

20 Claims, No Drawings

PROCESS FOR PRODUCING MOLDED ARTICLE USING A RELEASING AGENT

BACKGROUND OF THE INVENTION

1. Field of the invention

The present invention relates to a releasing agent for powder molding and a process for producing a molded article using said releasing agent. More particularly, the present invention relates to a releasing agent for powder molding, which comprises a polymer having (a) a silyl group having methyl group or fluorine atom-containing substituent of 1-20 carbon atoms as a side chain or (b) (poly)dimethylsiloxanyl group (in this specification, "(poly)dimethylsiloxanyl" means "dimethylsiloxanyl" or "(poly)dimethylsiloxanyl") having a methyl group or a fluorine atom-containing substituent of 1-20 carbon atoms at the terminal, as well as to a process for producing a molded article using said releasing agent.

2. Prior Art

There were recently developed various molding processes and coating processes each using a powdery synthetic resin. Typical of these processes include a rotational molding process, a slush molding process, a fluidization dip coating process and an electrostatic coating process. All of these molding and coating processes have an advantage in that they can produce an intended pattern very well. Therefore, the molds used in these molding and coating processes have a very complex shape with fine projections and depressions. However, the molded articles obtained with such molds mesh tightly like a dropped anchor with the fine projections and depressions of the molds, making it difficult to peel them from the molds with complex shape. Hence, there has conventionally been adopted a method of imparting lubricity to the interface between mold and molded article, and there has been widely used, as a releasing agent, an internal lubricant which is added to a molding material, or an external lubricant which is coated on the surface of the mold.

These conventional releasing agents for powder molding are intended to allow the interface between mold and molded article to have lubricity. However, the internal lubricant which is added to a molding material, is superior in handling but very easily bleeds out onto the surface of molded article. Reducing the bleeding by improving the compatibility of the internal lubricant with a resin (e.g. vinyl chloride resin) which is a main component of molding material, invites retention of the internal lubricant within the molded article and resultantly no migration of the lubricant to the interface between mold and molded article; therefore, the lubricant does not achieve the intended effect. On the other hand, the external lubricant which is coated on a mold for reduction in peeling strength, has poor compatibility with both the mold and a molded article and accordingly induces repellence between the mold and the molded article; thus, it has an excellent releasing effect. However, when the molded article is peeled from the mold, the external lubricant is repelled by the surfaces of the mold and the molded article because of its poor compatibility with them, and remains on the surfaces in liquid or solid spots. This requires, after molding, cleaning of the molded article and the mold to remove the external lubricant remaining thereon. Cleaning of the mold in particular, after each molding operation, reduces work efficiency; in order to avoid low work efficiency, mold cleaning is actually effected once per several molding operations. Such continuous use of mold without cleaning, however, causes the oxidation and/or decomposition of external releasing agent and results in gradual cloudiness in spots of the mold's mirror surface. Further progress of this phenomenon causes coverage of the fine projections and depressions of the mold by oxidized and/or decomposed external lubricant. Since in powder molding, the pattern of a mold is reproduced precisely, the coverage of the projections and depressions or the formation of cloudy portions implies that these covered or cloudy portions are also reproduced as such in the molded article.

The objects of the present invention are to provide a releasing agent for powder molding, which is free from the above-mentioned drawbacks of the conventionally known releasing agent for powder molding, and which uses a volatile solvent type polymer capable of forming a film of larger contact angle than the conventional releasing agents and accordingly of good releasability, as well as to provide a process for producing a molded article using said releasing agent.

SUMMARY OF THE INVENTION

The present invention relates to a releasing agent for powder molding, which comprises, as an essential component, a copolymer AB obtained by copolymerizing at least one monomer A represented by the following general formula (I)

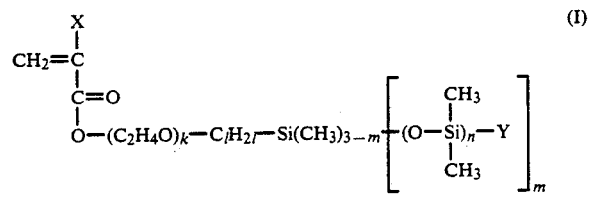

(X is a hydrogen atom or a methyl group; k is an integer of about 0-5; l is an integer of about 1-3; m is a integer of about 1-3; n is an integer of about 0-550; Y is a methyl group or a fluorine atom-containing substituent having about 1-20 carbon atoms) and at least one vinyl-copolymerizable monomer B copolymerizable with at least one monomer A, as well as to a process for producing a molded article using said releasing agent.

DETAILED DESCRIPTION OF THE INVENTION

In the releasing agent for powder molding according to the present invention, there is used, as the essential component, a copolymer AB obtained by copolymerizing at least one monomer A represented by the general formula (I) and at least one vinyl-copolymerizable monomer B copolymerizable therewith. The copolymer AB contains the unit derived from the monomer A in an amount of preferably about 2-50% by weight, more preferably about 5-35% by weight based on the weight of the copolymer AB. With respect to the monomer B, it is preferable that this monomer B contains at least one alkyl acrylate or alkyl methacrylate whose alkyl group has about 1-8 carbon atoms, and the content of the unit derived from said alkyl acrylate or alkyl methacrylate in the copolymer AB ranges about 25-98% by weight, preferably about 40-95% by weight based on the weight of copolymer AB. It is possible that two or more copolymers AB are optionally used in combination.

The monomer A as a material for the copolymer AB is represented by the general formula (I) and is an unsaturated monoester having, within the molecule, (poly)-dimethylsiloxanyl group (n is 1 or more) or a silyl group (n is 0). In the formula (I), n is defined to be about 0-550 because when n is greater than 550, the monomer has reduced polymerizability and/or copolymerizability, making it difficult to obtain a copolymer AB capable of forming a uniform film.

Also in the formula (I), it is desirable that k is about 0-5 and l is about 1-3, because of the availability of the material, effective releasing ability and simple synthesis. Further, the number of the (poly)dimethylsiloxanyl group (in case n is 1 or more) or the group represented by Y (in case n is 0) can be 1-3.

Specific compound names of the monomer A represented by the general formula (I) are mentioned below as examples. When Y is a methyl group-containing substituent, there can be mentioned 3-(trimethylsilyl)propyl(meth)acrylate, 3-[dimethyl(trimethylsiloxanyl)silyl]propyl(meth)acrylate, polydimethylsiloxanylmethyl (meth)acrylate, 2-(polydimethylsiloxanyl)ethyl (meth)acrylate, 3-(polydimethylsiloxanyl)propyl (meth)acrylate, α-(meth)acryloyl-ω-(3-polydimethylsiloxanylpropyl) monoethylene glycol, α-(meth)acryloyl-ω-(3-polydimethylsiloxanylpropyl) triethylene glycol, 3-[bis(polydimethylsiloxy)methylsilyl]propyl (meth)acrylate and 3-[tris(polydimethylsiloxy)silyl]propyl (meth)acrylate (in all of these compounds, n is not more than 550). When Y is a fluorine atom-containing substituent of 1-20 carbon atoms, there can be mentioned 3-[bis(2-pentafluoroethylethyl)methylsilyl]propyl(meth)acrylate, 3-[tris{(2-pentafluoroethylethyl)dimethylsiloxy}silyl]propyl(meth)acrylate, 3-[ω-(2-nonafluorobutylethyl)polydimethylsiloxanyl]propyl (meth)acrylate, 3-[ω-(2-heptadecafluorooctylethyl)polydimethyl-siloxanyl]propyl (meth)acrylate, 3-[bis[ω-(2-pentatriaconta-fluoroheptadecylethyl)polydimethylsiloxy]methylsilyl]propyl (meth)acrylate, 3-[tris[ω-(2-pentatriacontafluoro-heptadecylethyl)polydimethylsiloxy]silyl]propyl (meth)acrylate and 3-(ω-heptafluorophenylpolydimethylsiloxanyl]propyl (meth)acrylate (in all of these compounds, n is not more than 550). One or more of these specific compounds can be used as the monomer A. Incidentally, the (meth)acrylate means that it can be any of acrylate and methacrylate, and the (meth)acryloyl means that it can be any of acryloyl and methacryloyl (The same applies hereinafter.).

The above compounds as the monomer A are easily available commercially. They are synthesized by, for example, reacting (meth)acrylic acid with allyl alcohol or an alkylene glycol monoallyl ether to obtain an ester and then subjecting the ester to an addition reaction with a trimethylsilyl compound, a silyl compound having 1-3 fluorine atom-containing substituents of 1-20 carbon atoms, a (poly)dimethylsiloxane compound or a polydimethylsiloxane compound having, at the terminal, a fluorine atom-containing substituent of 1-20 carbon atoms.

As the vinyl monomer B which is another material for the copolymer AB, there can be used at least one member selected from, for example, methacrylic acid; methacrylic acid esters such as methyl methacrylate, ethyl methacrylate, 2-ethylhexyl methacrylate, 2-hydoroxyethyl methacrylate, and the like; acrylic acid; acrylic acid esters such as ethyl acrylate, butyl acrylate, 2-ethylhexyl acrylate, 2-hydoroxyethyl acrylate, and the like; maleic acid; maleic acid esters such as dimethyl maleate, diethyl maleate and the like; fumaric acid; fumaric acid esters such as dimethyl fumarate, diethyl fumarate and the like; styrene; vinyltoluene; α-methylstyrene; vinyl chloride; vinyl acetate; butadiene; acrylamide; and acrylonitrile.

The vinyl monomer B acts as a modifier for endowing the releasing agent film with various properties required so as to meet application purposes. The vinyl monomer B is also a component convenient for obtaining a polymer of higher molecular weight than the homopolymer of the monomer A. The amount of the monomer B used is determined in an appropriate range by considering the above property requirements for a releasing agent film and the releasability based on the monomer A. The proportion of the unit derived from the monomer B in the copolymer AB can be generally about 50-98% by weight, preferably about 65-95% by weight. In other words, when the proportion of the monomer A unit in the copolymer AB is about 2-50% by weight, preferably about 5-35% by weight, the releasability based on the monomer A can be exhibited fully. When the proportion of the monomer A unit is less than 2% by weight, insufficient releasability may possibly be expressed, and when the proportion is more than 50% by weight, the resulting releasing agent has poor compatibility with a resin (molding material), which may cause bleeding of releasing agent from molded article or retention of the releasing agent on the mold. Accordingly, it is preferable that the amounts of the monomer A and the monomer B are determined appropriately so that the units derived from the monomer A and the monomer B are in the above ranges. Further, in order to improve the compatibility of the releasing agent with the resin and transfer all the filmy releasing agent on the mold to the molded article during molding operation (no releasing agent remains on the mold), and moreover in order to allow the releasing agent transferred to the molded article to cause neither bleeding nor blooming on the molded article, it is desirable that the monomer B contain at least one alkyl (meth)acrylate whose alkyl group has 1-8 carbon atoms and that the content of the unit derived from the alkyl (meth)acrylate in the copolymer AB ranges about 25-98% by weight, preferably about 40-95% by weight based on the weight of copolymer AB. When the content is less than 25% by weight, it is difficult to obtain a releasing agent having good compatibility with the resin, and when the content is more than 98% by weight, the molded article may not have sufficient releasability. As example of the alkyl (meth)acrylate whose alkyl group has 1-8 carbon atoms, there can be mentioned, those acrylic acid esters and methacrylic acid esters specifically mentioned as examples of monomer B.

The copolymer AB can be obtained by polymerizing the monomer A and monomer B in the presence of a vinyl polymerization initiator, by solution polymerization, bulk polymerization, emulsion polymerization, suspension polymerization or the like according to a conventional method. As the vinyl polymerization initiator. There can be mentioned, for example, azo compounds such as azobisisobutyronitrile, triphenylmethylazobenzen and the like, and peroxides such as benzoyl peroxide, di-t-butyl peroxide and the like.

The thus obtained copolymer AB preferably has a number-average molecular weight of about 1,000-300,000. When the molecular weight is too low, it is difficult to form a film on the mold which can with-stand a molding operation, and when the molecular weight is too high, such a copolymer must be used in a small amount to prepare a coating varnish of proper viscosity, and therefore such a varnish needs to be coated several times to obtain a dried film of desired thickness on the mold.

As mentioned above, the releasing agent for powder molding according to the present invention is used ordinarily in the form of a varnish obtained by dissolving the copolymer AB in an organic solvent. In view of this point, the polymerization method for obtaining the copolymer AB is desirably solution polymerization or bulk polymerization, in particular. In the solution polymerization, the reaction mixture after polymerization can be used as it is or by diluting with a solvent. In the bulk polymerization, the reaction product is mixed with a solvent and then used.

As the organic solvent, there can be mentioned, for example, aromatic hydrocarbon solvents such as xylene, toluene and the like; ester solvents such as ethyl acetate, butyl acetate and the like; ether solvents such as a dioxane, diethyl ether and the like; alcohol solvents such as butyl alcohol and the like; and ketone solvents such as methylethyl ketone, methyl isobutyl ketone and the like. These solvents can be used alone or in admixture.

The amount of the organic solvent used is desirably such that the concentration of copolymer AB in the varnish becomes ordinarily about 0.5–40% by weight, particularly about 1–10% by weight. The desirable viscosity of the varnish is generally about 10 poises or less at 25° C. because film formation is easy at this viscosity level.

The present releasing agent for powder molding constituted as above may contain, optionally, a coloring agent such as pigment (e.g. titanium dioxide), dye or the like. The releasing agent may further contain an anti-sagging agent, a dispersant for pigment, an anti-settling agent, a levelling agent, an antifoaming agent, etc. all of conventional use.

Formation of a releasing agent film on the surface of a mold using the present releasing agent for powder molding, can be effected simply by, for example, coating the releasing agent of varnish form on the mold surface by an appropriate means and then drying the coated mold at normal temperature or with heating to evaporate and remove the solvent contained in the coated varnish. Thereby, a releasing agent film of small surface tension and good lubricity can be formed uniformly.

Thus, the releasing agent for powder molding according to the present invention is coated on the surface of a mold; the coated mold is heated; a material for powder molding is allowed to adhere to the heated mold and thereby melted; the total system is cooled; the resulting molded article is peeled from the mold; and thus a molded article can be produced.

The material for powder molding, i.e. the resin for obtaining a molded article therefrom is preferably a non-rigid vinyl chloride resin containing a plasticizer. As the vinyl chloride resin, there can be used a vinyl chloride polymer or a copolymer of vinyl chloride and a monomer copolymerizable therewith, and the polymer or copolymer is preferably produced generally by suspension polymerization or bulk polymerization so that it has large particle diameters and is porous in order to have good absorbability for the plasticizer. As the monomer copolymerizable with vinyl chloride, there is preferred at least one compound selected from, for example, ethylene, propylene, butene, 1-pentene, vinyl acetate, dialkyl maleates (the alkyl groups have 1–12 carbon atoms), dialkyl fumarates (the alkyl groups have 1–12 carbon atoms), vinyl esters of carboxylic acids (e.g. caproic acid, caprylic acid, benzoic acid), vinylidene chloride and alkyl vinyl ethers (the alkyl group has 1–16 carbon atoms). As the copolymer, preferable is one obtained by copolymerizing 100 parts by weight of vinyl chloride and 40 parts by weight or less, preferably 30 parts by weight or less, of at least one comonomer as mentioned above in the presence of a polymerization initiator.

The plasticizer to be absorbed by the vinyl chloride polymer may be any plasticizer as long as it can be used in vinyl chloride resins. For example, there can be used dialkyl phthalate, dialkyl adipate, trialkyl trimellitate, dialkyl sebacate, dialkyl azelate, alkyl benzyl phthalate, trialkyl phosphate and alkyl allyl phosphate (these alkyl groups have 4–13 carbon atoms), as well as polyester plasticizers. Specifically, there can be mentioned di-n-butyl phthalate, di-n-octyl phthalate, di-2-ethylhexyl phthalate (DOP), diisooctyl phthalate, octyl decyl phthalate, diisodecyl phthalate, butyl benzyl phthalate, di-2-ethylhexyl isophthalate, di-2-ethylhexyl adipate (DOA), di-n-decyl adipate, diisodecyl adipate, tri-2-ethylhexyl trimellitate, tri-n-octyl trimellitate, tridecyl trimellitate, 2-ethylhexyl azelate, dibutyl sebacate, di-2-ethylhexyl sebacate, tributyl phosphate, 2-ethylhexyl phosphate, 2-ethylhexyl diphenyl phosphate, tricresyl phosphate, etc. These compounds can be used alone or in admixture of two or more. The amount of the plasticizer used is about 20–150 parts by weight, preferably about 40–130 parts by weight per 100 parts by weight of the vinyl chloride polymer.

The vinyl chloride polymer containing the absorbed plasticizer may further contain other additives such as stabilizer, coloring agent, lubricant, filler, secondary plasticizer and the like to the extent that these additives give no adverse effects on powder molding.

The resin composition for powder molding can be obtained using an ordinary means, and no special means is required. It can be obtained by using, for example, a mixer with a jacket for cooling and heating, or a Henschel Mixer ®. Specifically, there are placed in such a mixer, a vinyl chloride polymer, a required amount of plasticizer, a heat stabilizer, a lubricant, a pigment, etc.; they are stirred while steam is passed through the mixer jacket to heat them to about 110–130° C.; then, stirring is continued for 10–40 minutes, preferably 10–30 minutes with the temperature kept not to exceed 130° C., to allow the resin (the vinyl chloride polymer) to sufficiently absorb the plasticizer. Heating at temperatures above 130° C. is undesirable because the vinyl chloride polymer causes gelation, although the gelation is somewhat influenced by the mixing ability, number of revolutions, blade shape, etc. of the mixer. Meanwhile, heating at low temperature is also undesirable because the absorption rate for plasticizer is low, the mixing efficiency is low, and the portion of the plasticizer not absorbed by the vinyl chloride polymer remains on the surfaces of polymer articles and the resulting resin composition for powder molding has reduced fluidity as a powder. Hence, the temperature during stirring is preferably kept at about 110°–130° C., preferably about 115°–125° C. Next, the contents in the mixer are cooled to around normal temperature by passing cooling water instead of steam through the jacket. Lastly, a necessary amount (ordinarily about 5-20 parts by weight per 100 parts by weight of the resin) of the polyvinyl chloride obtained by emulsion polymerization is added to the mixer contents, and stirring is effected for an additional period of about 2-10 minutes to allow the surfaces of the particles of mixer contents to be covered with the vinyl chloride emulsion polymer.

The copolymer AB used in the present invention has, as a side chain, a silyl group or (poly)dimethylsiloxanyl group having a polymerization degree (n) of about 1-550, derived from the monomer A. The side chain has, as Y, a methyl group or fluorine atom-containing substituent of about 1-20 carbon atoms at the terminal. Accordingly, the film formed by the copolymer has good lubricity and can effectively prevent the powder molding material which has been melted and has become a gel on the heated mold, from sticking to the mold. This effect of preventing sticking is at least equal to those of the above-mentioned conventional releasing agents for powder molding.

Further, since the releasing agent for powder molding according to the present invention has very good compatibility with the resin (the molding material), the releasing agent coated on the mold migrates completely onto the surface of the molded article at the time of peeling the molded article from the mold. As a result, no releasing agent remains can the mold surface and there is no fear of the problems experienced with the conventional external lubricants, such as decomposition of releasing agent, cloudiness of mold's mirror surface, cleaning of mold and the like.

Further, the molded article which has been peeled from the mold, has thereon a film of the releasing agent, and this film and the molded article are strongly bonded to each other. Therefore, the molded article is endowed with such properties as prevention of bleeding, prevention of dust or stain sticking, slipperiness (non-tackiness) and the like.

Further, since the copolymer AB is soluble in organic solvents, it can easily made into a uniform film by dissolving it in an organic solvent, coating the resulting solution onto the mold surface and then drying the coated mold. Moreover, since the copolymer AB is not a reactive and curing type but an essentially non-reactive type, the film formed therewith is not affected by the moisture in the atmosphere or the environmental temperature. In addition, the releasing agent, when made into a solution, has excellent storage stability.

The releasing agent for powder molding according to the present invention is not a type which causes cross-linking during film formation, and accordingly is hardly cured or dried by humidity, temperature, etc. As a result, with the present releasing agent there is seen neither peeling caused by insufficient curing of film, nor reduction in releasability due to bulging, etc. Further, since film formation is caused only by solvent evaporation on coated surface, drying occurs rapidly and the mold, etc. coated with the present releasing agent can be used in a short time.

As shown in Examples and Comparative Examples, the film formed with the present releasing agent has a very large contact angle and endows the surface of the mold with good slipperiness. Consequently, peeling of a molded article from a mold having formed thereon a film of the present releasing agent can be done very smoothly. This eliminates pulling of the molded article by strong forces and consequent deformation of the molded article. Further, since the releasing agent film is inactive and heat-resistant, there can be prevented adhesion of powder molding material to the mold, caused by fusion of the material. Furthermore, since the releasing agent film has good compatibility with resin (powder molding material), the film migrates completely from the mold, and no releasing agent remains on the mold. This is shown in Table 3; that is, in a continuous molding by an ordinary mold, cloudiness of the mold surface begins at about the 30th molding and no mirror surface is present at the 50th molding. Further, since the present releasing agent which has migrated to the surface of molded article has a strong bond with the molded article, the releasing agent is not peeled from the molded article surface and retains its properties. Therefore, the molded article surface is endowed with very good slipperiness. The presence of the strong bond assures freedom from plasticizer migration, dust pickup and staining, and is superior in scratch resistance. Also, there occurs no sticking of molded articles to each other.

When the present releasing agent is stored in a solution form, it has good stability to moisture and heat; which serves for reduced cost. When there remains a part of the present releasing agent solution after its use, it can be stored for reuse simply by stoppering the container.

EXAMPLES

The present invention is described more specifically by way of Examples and Comparative Examples. The polymer solutions used in Examples 1-11 and Comparative Examples 2-4 were prepared in Production Examples 1-11. In the production examples, parts refer to parts by weight, and each molecular weight refers to a number-average molecular weight determined by GPC.

PRODUCTION EXAMPLE 1

500 g of toluene was charged into a flask provided with a stirrer and heated to 80° C. To this toluene being stirred was added dropwise in 2 hours a mixed solution consisting of 300 g of methylmethacrylate (hereinafter refereed to as MMA), 129 g of 3-(polydimethylsiloxanyl)propyl methacrylate (a monomer A of the general formula (I) wherein X and Y are both a methyl group, k is 0, l is 3, m is 1, n (the average polymerization degree of polydimethylsiloxane) is 11) and 4.85 g of azobisisobutyronitrile. After the completion of the dropwise addition, the mixture was stirred for 6 hours at the same temperature to complete polymerization. The resulting copolymer AB had a number-average molecular weight of 13,000 and contained the unit derived from the monomer A and unit derived from MMA in amounts of 30 parts by weight and 70 parts by weight, respectively. Toluene used as a solvent was evaporated by an evaporator to obtain a solid copolymer AB-1.

PRODUCTION EXAMPLE 2

500 g of toluene was charged into a flask provided with a stirrer and heated to 80° C. To this toluene being stirred was added dropwise in 2 hours a mixed solution consisting of 300 g of MMA, 129 g of 3-(polydimethylsiloxanyl)propyl methacrylate (a monomer A of the general formula (I) wherein X and Y are both a methyl group, k is 0, l is 3, m is 1, n (the average polymerization degree of polydimethylsiloxane) is 65) and 4.85 g of azobisisobutyronitrile. After the completion of the dropwise addition, the mixture was stirred for 6 hours at the same temperature to complete polymerization. The resulting copolymer AB had a number-average molecular weight of 11,000 and contained the unit derived from the monomer A and unit derived from MMA in amounts of 30 parts by weight and 70 parts by weight, respectively. Toluene used as a solvent was evaporated by an evaporator to obtain a solid copolymer AB-2.

PRODUCTION EXAMPLE 3

1,050 g of toluene was charged into a flask provided with a stirrer and heated to 70° C. To this toluene being stirred was added dropwise in 2 hours a mixed solution consisting of 415 g of MMA, 135 g of 3-(polydimethylsiloxanyl)propyl methacrylate (a monomer A of the general formula (I) wherein X and Y are both a methyl group, k is 0, l is 3, m is 1, n (the average polymerization degree of polydimethylsiloxane) is 132) and 1.00 g of azobisisobutyronitrile. After the completion of the dropwise addition, the mixture was stirred for 22 hours at the same temperature to complete polymerization. The resulting copolymer AB had a number-average molecular weight of 11,800 and contained the unit derived from the monomer A and unit derived from MMA in amounts of 30 parts by weight and 70 parts by weight, respectively. Toluene used as a solvent was evaporated by an evaporator to obtain a solid copolymer AB-3.

PRODUCTION EXAMPLE 4

1,300 g of toluene was charged into a flask provided with a stirrer and heated to 80° C. To this toluene being stirred was added dropwise in 2 hours a mixed solution consisting of 392 g of MMA, 168 g of 3 (polydimethylsiloxanyl)propyl methacrylate (a monomer A of the general formula (I) wherein X and Y are both a methyl group, k is 0, l is 3, m is 2, n (the average polymerization degree of polydimethylsiloxane) is 268) and 6.70 g of azobisisobutyronitrile. After the completion of the dropwise addition, the mixture was stirred for 23 hours at the same temperature to complete polymerization. The resulting copolymer AB had a number-average molecular weight of 144,000 and contained the unit derived from the monomer A and unit derived from MMA in amounts of 30 parts by weight and 70 parts by weight, respectively. Toluene used as a solvent was evaporated by an evaporator to obtain a solid copolymer AB-4.

PRODUCTION EXAMPLE 5

500 g of toluene was charged into a flask provided with a stirrer and heated to 70° C. To this toluene being stirred was added dropwise in 2 hours a mixed solution consisting of 150 g of MMA, 150 g of 3-(polydimethylsiloxanyl)propyl methacrylate (a monomer A of the general formula (I) wherein X and Y are both a methyl group, k is 0, l is 3, m is 1, n (the average polymerization degree of polydimethylsiloxane) is 132) and 2.50 g of azobisisobutyronitrile. After the completion of the dropwise addition, the mixture was stirred for 21 hours at the same temperature to complete polymerization. The resulting copolymer AB had a number-average molecular weight of 10,000 and contained the unit derived from the monomer A and unit derived from MMA in amounts of 50 parts by weight and 50 parts by weight, respectively. Toluene used as a solvent was evaporated by an evaporator to obtain a solid copolymer AB-5.

PRODUCTION EXAMPLE 6

500 g of toluene was charged into a flask provided with a stirrer and heated to 80° C. To this toluene being stirred was added dropwise in 2 hours a mixed solution consisting of 240 g of MMA, 60 g of styrene, 129 g of 3.(polydimethylsiloxanyl)propyl methacrylate (a monomer A of the general formula (I) wherein X and Y are both a methyl group, k is 0, l is 3, m is 1, n (the average polymerization degree of polydimethylsiloxane) is 65) and 3.25 g of azobisisobutyronitrile. After the completion of the dropwise addition, the mixture was stirred for 6 hours at the same temperature to complete polymerization. The resulting copolymer AB had a number-average molecular weight of 10,400 and contained the unit derived from the monomer A, the unit derived from MMA and a unit derived from styrene in amounts of 30 parts by weight, 55 parts by weight and 15 parts by weight, respectively. Toluene used as a solvent was evaporated by an evaporator to obtain a solid copolymer AB-6.

PRODUCTION EXAMPLE 7

In a flask provided with a stirrer were placed 500 g of ethyl acetate, 300 g of methyl acrylate, 130 g of 3-(polydimethylsiloxanyl)propyl acrylate (a monomer A of the general formula (I) wherein X is a hydrogen atom, Y is a methyl group, k is 0, l is 3, m is 1, n (the average polymerization degree of polydimethylsiloxane) is 132) and 0.05 g of azobisisosbutyronitrile. They were heated to 60° C. in 10 minutes with stirring. Then, the mixture was kept at that temperature and stirring was effected for 20 hours to complete polymerization. The resulting copolymer AB had a number-average molecular weight of 286,400 and contained the unit derived from the monomer A and unit derived from methyl acrylate in amounts of 30 parts by weight and 70 parts by weight, respectively. Ethyl acetate used as a solvent was evaporated by an evaporator to obtain a solid copolymer AB-7.

PRODUCTION EXAMPLE 8

In a flask provided with a stirrer were placed a mixed solution consisting of 360 g of toluene, 70 g of MMA, 30 g of 3-[ω(2-heptadecafluorooctylethyl)polydimethylsiloxanyl]propyl methacrylate (a monomer A of the general formula (I) wherein X is a methyl group, Y is a 2-heptadecafluorooctylethyl group, k is 0, l is 3, m is 1, n (the average polymerization degree of polydimethylsiloxane) is 65) and 1.10 g of azobisisobutyronitrile. They were heated to 70° C. in about 20 minutes with stirring. Then, the mixture was stirred for 17 hours at that temperature to complete polymerization. The resulting copolymer AB had a number-average molecular weight of 9,400 and contained the unit derived from the monomer A and unit derived from MMA in amounts of 30 parts by weight and 70 parts by weight, respectively. Toluene used as a solvent was evaporated by an evaporator to obtain a solid copolymer AB-8.

PRODUCTION EXAMPLE 9

In a flask provided with a stirrer were placed a mixed solution consisting of 360 g of toluene, 70 g of MMA, 30 g of 3-(ω-heptafluorophenylpolydimethylsiloxanyl)propyl acrylate (a monomer A of the general formula (I) wherein X is a methyl group, Y is a heptafluorophenyl group, k is 0, l is 3, m is 1, n (the average polymerization degree of polydimethylsiloxane) is 64) and 1.20 g of azobisisobutyronitrile. The mixture was heated to 80° C. in about 20 minutes with stirring. Then, the mixture was stirred for 8 hours at that temperature to complete polymerization. The resulting copolymer AB had a number-average molecular weight of 16,800 and contained the unit derived from the monomer A and unit derived from MMA in amounts of 30 parts by weight and 70 parts by weight, respectively. Toluene used as a solvent was evaporated by an evaporator to obtain a solid copolymer AB-9.

PRODUCTION EXAMPLE 10

500 g of toluene was charged into a flask provided with a stirrer and heated to 70° C. To this toluene being stirred was added dropwise in 2 hours a mixed solution consisting of 105 g of MMA, 195 g of 3-(polydimethylsiloxanyl)propyl methacrylate (a monomer A of the general formula (I) wherein X and Y are both a methyl group, k is 0, l is 3, m is 1, n (the average polymerization degree of polydimethylsiloxane) is 132) and 1.75 g of azobisisobutyronitrile. After the completion of the dropwise addition, the mixture was stirred for 21 hours at the same temperature to complete polymerization. The resulting copolymer AB had a number-average molecular weight of 12,600 and contained the unit derived from the monomer A and the unit derived from MMA in amounts of 65 parts by weight and 35 parts by weight, respectively. Toluene used as a solvent was evaporated by an evaporator to obtain a solid copolymer AB-10.

PRODUCTION EXAMPLE 11

500 g of toluene was charged into a flask provided with a stirrer and heated to 70° C. To this toluene being stirred was added dropwise in 2 hours a mixed solution consisting of 370 g of MMA, 3 g of 3-(polydimethylsiloxanyl)propyl methacrylate (a monomer A of the general formula (I) wherein X and Y are both a methyl group, k is 0, l is 3, m is 1, n (the average polymerization degree of polydimethylsiloxane) is 134) and 1.55 g of azobisisobutyronitrile. After the completion of the dropwise addition, the mixture was stirred for 6 hours at the same temperature to complete polymerization. The resulting copolymer AB had a number-average molecular weight of 18,200 and contained the unit derived from the monomer A and the unit derived from MMA in amounts of 1 parts by weight and 99 parts by weight, respectively. Toluene used as a solvent was evaporated by an evaporator to obtain a solid copolymer AB-11.

PRODUCTION EXAMPLE OF MATERIAL FOR POWDER MOLDING

In a Henschel Mixer ® was placed 3,000 g of a vinyl chloride resin (a vinyl chloride homopolymer obtained by suspension polymerization) having an average polymerization degree of 800. Stirring was effected while steam was passed through the jacket, whereby the vinyl chloride resin was heated. When the temperature reached 70° C., there were added 150 g of a Ba-Zn type stabilizer, 150 g of an epoxidized soybean oil, 2,250 g of a mixed phthalate plasticizer consisting of dinonyl phthalate, didecyl phthalate and diundecyl phthalate, and 60 g of a black pigment. The resulting mixture was heated to 120° C. and stirred for 20 minutes keeping the temperature at about 120° C. to allow the vinyl chloride resin to thoroughly absorb the plasticizer. Then, cooling water instead of steam was passed through the jacket to cool the mixture. When the mixture was cooled to 50° C., there was added 360 g of a polyvinyl chloride obtained by emulsion polymerization. Stirring was effected for more than 5 minutes. The resulting mixture was cooled to around normal temperature and then taken out to obtain a material for powder molding.

EXAMPLES 1-11

Each of the copolymers AB-1 to AB-9 and acetone were mixed with a stirrer at 60 ppm according to the compounding composition shown in Table 1 which is given later, whereby 11 kinds of releasing agent solutions for powder molding were prepared. In each of the releasing agent solutions were immersed an iron plate 1 of 100 mm×50 mm×3.2 mm with a hard chromium plating of 30–50 μm in thickness, and an iron plate 2 of 50 mm×30 mm×3.2 mm with the same hard chromium plating. Also, an iron plate 3 of 300 mm×300 mm×4.0 mm with the same hard chromium plating was spray coated on one side with each of the releasing agent solutions. These iron plates were then subjected to solvent evaporation at normal temperature, whereby a thin film of copolymer AB was formed on each iron plate.

COMPARATIVE EXAMPLE 1

The same iron plates, 1, 2 and 3, as used in each of Examples 1-11, were not treated with any releasing agent solution and were used for the tests shown in Tables 2 and 3 (given later), as they were.

COMPARATIVE EXAMPLES 2 AND 3

The same procedure as in Examples 1-11 was repeated except that the copolymer AB-10 or AB-11 was used in place of the copolymers AB-1 to AB-9, whereby a thin film of one of the two releasing agents for powder molding whose compounding compositions are shown in Table 1 was formed on the same iron plates 1, 2 and 3, as used in each of Examples 1-11.

COMPARATIVE EXAMPLES 4 AND 5

The same procedure as in Examples 1-11 was repeated except that KF-96 ™ (a silicone oil produced by Shin-Etsu Chemical Co., Ltd.) or stearic acid was used in place of each of the copolymers AB-1 to AB-9, whereby one of the two releasing agents whose compounding compositions are shown in Table 1 was allowed to adhere to the same iron plates 1, 2 and 3, as used in each of Examples 1-11.

The iron plates treated or not treated with each releasing agent, prepared in Examples 1-11 and Comparative Examples 1-5, as well as the molded articles obtained by baking the material for powder molding on the above iron plates, were measured for the following mold release test, contact angle on releasing agent film, contact angle on iron plate after peeling, contact angle on molded film after peeling, bleeding and blooming test of molded article, blocking test, abrasion test and return baking property, to evaluate each releasing agent.

(1) Mold release test

Each iron plate 1 having thereon a thin film of a releasing agent for powder molding, obtained in Examples 1-11 and Comparative Examples 1-5 (the iron plate 1 obtained in Comparative Example 1 had no thin film) was placed in a heating furnace kept at 240°±5° C., for 10 minutes for preheating. Then, it was rapidly taken out and placed on a stand. On the iron plate 1 on the stand was sprinkled the above prepared material for powder molding, filled in a 120-cc cup, and the material was baked for 5 seconds. After wiping off the unmelted excess material, the resulting iron plate was quickly returned to the heating furnace and heated for 2 minutes to completely melt the powder molding material on the iron plate and thereby to form a molded film on the iron plate. The iron plate with a molded film was cooled to normal temperature in a room. The molded film was cut in a rectangular form of 3 cm×8 cm so that the rectangular form was positioned in the center of the iron plate. By leaving only this rectangular portion, the surrounding portion of the molded film was removed. The resulting iron plate was allowed to stand for 24 hours at 25° C. to prepare a test sample. The test sample was firmly fixed to the lower fixing part of STROGRAPH®, manufactured by Tokyo Seiki Seisaku-Sho, Ltd. One end of a 30-cm long kite string was firmly fixed to the upper fixing part of STROGRAPH®. Another end of the kite string was fixed to a 3-cm wide clip. The lower 1-cm portion of the rectangular molded film on the test sample was peeled from the iron plate and pinched by the clip so that the molded film caused no protrusion from the clip. After the above procedure had been completed, pulling was effected at a speed of 500 mm/min to peel the molded film from the iron plate. The average values of the strength applied were divided by the width of the molded film, and the resulting quotient of each was taken as a peeling strength. This test was effected 5 times for each releasing agent for powder molding and an average value was calculated. The results are shown in Table 2. The peeling strength of each test sample was divided by the peeling strength of the test sample prepared from the iron plate 1 of Comparative Example 1 having no releasing agent film, and the resulting percentage was taken as a change ratio (%) of peeling strength. The smaller the peeling strength and change ratio of a test sample, the better is the releasability of the test sample. (2) Contact angle on releasing agent film Each iron plate 2 having thereon a thin film of a releasing agent for powder molding, obtained in Examples 1-11 and Comparative Examples 1-5 (the iron plate 2 obtained in Comparative Example 1 had no thin film) was left at rest on the test stand of GONIOMETER G-1® (a contact angle tester manufactured by K. K. ERMA). Thereon was carefully dropped 4 cc of pure water by means of a syringe to form 5 water droplets at the same intervals. Via a reading microscope with an angle gauge, of GONIOMETER, there was measured an angle between (a) a circle formed by each droplet and (b) a horizontal line of the surface of the iron plate 2, to obtain a contact angle. Then, an average value of the contact angles of the five water droplets was calculated. The results are shown in Table 2. In Table 2, a larger contact angle indicates that the mold surface is more water repellant.

(3) Contact angle on iron plate after peeling

On each iron plate 2 having thereon a thin film of a releasing agent for powder molding, obtained in Examples 1-11 and Comparative Examples 1-5 (the iron plate 2 obtained in Comparative Example 1 had no thin film) was baked the above prepared material for powder molding under the same conditions as in the above item (1), to form a molded film on the iron plate 2. The iron plate having a molded film thereon was allowed to stand for 24 hours in a room of 25°±2° C. Then, the molded film was peeled from the mold. The surface of the resulting iron plate was measured for contact angle in the same manner as in the above item (2). The results are shown in Table 2. In Table 2, a larger difference of this contact angle on iron plate from the contact angle on releasing agent film obtained in the item (2) and a smaller difference of the former contact angle from the contact angle on the iron plate of Comparative Example 1 having no releasing agent film indicate that the amount of the releasing agent film remaining on the iron plate after peeling is less and that the transfer of the releasing agent film to the molded film is more complete.

(4) Contact angle on molded film after peeling

The surface of the molded film obtained in the above item (3) (the side of the molded film which had been in contact, before peeling, with the iron plate) was measured for contact angle in the same manner as in the above item (2). The results are shown in Table 2. In Table 2, a larger contact angle on the molded article after peeling indicates that the transfer of the releasing agent film to the molded film is more complete; and a larger contact angle on molded film after peeling as compared with the contact angle on molded film using the iron plate 1 of Comparative Example 1 having no releasing agent film thereon indicates that the molded film is endowed with higher releasability.

(5) Bleeding and blooming of molded article

Each molded film obtained in the above item (3) was suspended in a thermo-hygrostat of 80° C.×80%. (Four sheets per each molded film were suspended.) Each one sheet was taken out in 3 days, 7 days, 10 days and 14 days from the start of suspension, to examine the change of sheet surface with time. A releasing agent having poor compatibility with the resin of the molded film causes bleeding and blooming on the sheet surface. The degree of this bleeding and blooming was evaluated by visual observation according to the following 4 rating standards.

⊙:No bleeding and blooming.
○:Difficult to judge whether or not there are bleeding and blooming
Δ:Bleeding and blooming are slight.
X :Bleeding and blooming are significant.
The results are shown in Table 2.

(6) Blocking test

On each iron plate 3 having thereon a thin film of a releasing agent for powder molding, obtained in Example 3 and Comparative Example 1 (the iron plate 3 obtained in Comparative Example 1 had no thin film) was baked the above prepared material for powder molding under the same conditions as in the above item (1) except that the preheating was effected for 20 minutes and the material was used in an amount of 500 cc, to form a molded film on the iron plate 3. The iron plate with a molded film was allowed to stand for 24 hours in a room of 25°±2° C. The molded film was peeled from the mold and cut into shapes of 70 mm×20 mm to obtain rectangular samples as test pieces. Two of these test pieces were contacted with each other at respective ends so that the contact area became 20 mm×20 mm and the two pieces contacted at respective sides which had been in contact, before peeling, with the iron plate 3. A weight of 1 kg was placed on the contact portion, and the connected test pieces were allowed to stand for 23 hours in a constant temperature bath of 40° C. After removal, they were allowed to stand for 1 hour at room temperature; then, they were fixed to the STROGRAPH® used in the above item (1); peeling was effected at a speed of 50 mm/min and the strength applied was measured. The results are shown in Table 3. A smaller strength indicates weaker adhesion and higher slipperiness.

(7) Abrasion test

Each of the molded films obtained in the above item (6) was measured for abrasion in accordance with JIS K 7204, applying a load of 1,000 g and using two truck wheels (CS-17 and H-18). The results are shown in Table 3.

(8) Return baking property

On each iron plate 1 having thereon a thin film of a releasing agent for powder molding, obtained in Example 3 and Comparative Example 1 (the iron plate 1 obtained in Comparative Example 1 had no thin film) was formed a molded film in the same manner as in the above item (1). The iron plate 1 with a molded film was cooled to around normal temperature at which the iron plate could be touched by hand. The molded film was peeled from the iron plate, and the surface condition of the resulting iron plate was observed visually and evaluated according to the following four rating standards.

⊚: The surface retains the original mirror surface.
○: Difficult to judge whether or not the surface is very slightly cloudy.
Δ: The surface is slightly cloudy.
X: The surface is significantly cloudy.

After the above peeling of molded film, the iron plate 1 was immersed in the same releasing agent solution as used before, to form a thin film thereon (the iron plate 1 obtained in Comparative Example 1 was not immersed). The resulting iron plate was then subjected to a second molding. The side which was subjected to the second molding was the same as in the first molding. Thus, formation of molded film was repeated and the change of mirror surface was observed. The surface conditions after 0, first, third, 5th, 10th, 20th, 30th and 50th moldings were observed. The results are shown in Table 3.

TABLE 1

|  | Examples |  |  |  |  |  |  |  |  |  |  | Comparative examples |  |  |  |  |
|---|---|---|---|---|---|---|---|---|---|---|---|---|---|---|---|---|
|  | 1 | 2 | 3 | 4 | 5 | 6 | 7 | 8 | 9 | 10 | 11 | 1 | 2 | 3 | 4 | 5 |
| Copolymer AB-1 | 2 | | | | | | | | | | | | | | | |
| Copolymer AB-2 | | 2 | | | | | | | | 5 | 10 | | | | | |
| Copolymer AB-3 | | | 2 | | | | | | | | | | | | | |
| Copolymer AB-4 | | | | 2 | | | | | | | | | | | | |
| Copolymer AB-5 | | | | | 2 | | | | | | | | | | | |
| Copolymer AB-6 | | | | | | 2 | | | | | | | | | | |
| Copolymer AB-7 | | | | | | | 2 | | | | | | | | | |
| Copolymer AB-8 | | | | | | | | 2 | | | | | | | | |
| Copolymer AB-9 | | | | | | | | | 2 | | | | | | | |
| Copolymer AB-10 | | | | | | | | | | | | 2 | | | | |
| Copolymer AB-11 | | | | | | | | | | | | | 2 | | | |
| KF-96 (wt %) | | | | | | | | | | | | | | | 2 | |
| Stearic Acid (wt %) | | | | | | | | | | | | | | | | 2 |
| Acetone (wt %) | 98 | 98 | 98 | 98 | 98 | 98 | 98 | 98 | 98 | 95 | 90 | 98 | 98 | 98 | 98 | 98 |
| Concentration of active ingredient in releasing agent solution (wt %) | 2 | 2 | 2 | 2 | 2 | 2 | 2 | 2 | 2 | 5 | 10 | 2 | 2 | 2 | 2 | 2 |

TABLE 2

|  | Mold release test | | Contact angle on releasing agent film (°) | Contact angle after peeling | | Bleeding and blooming of molded article | | | | |
|---|---|---|---|---|---|---|---|---|---|---|
|  | Releasing strength (g/cm) | Change ratio (%) | | On iron plate (°) | On molded article (°) | Original | After 3 days | After 7 days | After 10 days | After 14 days |
| Example 1 | 2.7 | 69 | 97 | 78 | 96 | ⊚ | ⊚ | ⊚ | ⊚ | ⊚ |
| Example 2 | 2.5 | 64 | 103 | 78 | 97 | ⊚ | ⊚ | ⊚ | ⊚ | ⊚ |
| Example 3 | 1.8 | 46 | 112 | 74 | 101 | ⊚ | ⊚ | ⊚ | ⊚ | ⊚ |
| Example 4 | 2.0 | 51 | 110 | 80 | 104 | ⊚ | ⊚ | ⊚ | ○ | ○ |
| Example 5 | 1.5 | 38 | 115 | 82 | 107 | ⊚ | ⊚ | ⊚ | ○ | ○ |
| Example 6 | 2.7 | 69 | 99 | 78 | 96 | ⊚ | ⊚ | ⊚ | ⊚ | ⊚ |
| Example 7 | 1.9 | 49 | 113 | 76 | 103 | ⊚ | ⊚ | ⊚ | ○ | ○ |
| Example 8 | 2.2 | 56 | 106 | 79 | 98 | ⊚ | ⊚ | ⊚ | ⊚ | ⊚ |
| Example 9 | 2.3 | 59 | 104 | 80 | 98 | ⊚ | ⊚ | ⊚ | ⊚ | ⊚ |
| Example 10 | 1.9 | 49 | 109 | 81 | 103 | ⊚ | ⊚ | ⊚ | ⊚ | ⊚ |
| Example 11 | 1.7 | 44 | 111 | 84 | 104 | ⊚ | ⊚ | ⊚ | ○ | ○ |
| Comparative Example 1 | 3.9 | 100 | 70 | 68 | 81 | ⊚ | ○ | ○ | Δ | Δ |
| Comparative Example 2 | 1.2 | 31 | 117 | 108 | 110 | X | X | X | X | X |
| Comparative Example 3 | 4.0 | 100 | 77 | 72 | 82 | ⊚ | ⊚ | ⊚ | ⊚ | ⊚ |
| Comparative Example 4 | 2.9 | 74 | 104 | 102 | 98 | X | X | X | X | X |
| Comparative Example 5 | 3.2 | 82 | 98 | 95 | 94 | X | X | X | X | X |

TABLE 3

| | Blocking test (Kg/4 cm²) | Abrasion test (mg of reduced weight) | | Return baking property | | | | | |
|---|---|---|---|---|---|---|---|---|---|
| | | CS-17 | H-18 | Original | After 10th molding | After 20th molding | After 30th molding | After 40th molding | After 50th molding |
| Example 3 | 1.14 | 2.6 | 398 | ◉ | ◉ | ◉ | ◉ | ◉ | ◉ |
| Comparative Example 1 | 0.75 | 2.2 | 270 | ◉ | ◉ | ○ | ○ | △ | △ |

EXAMPLE 12

490 g of acetone and 10 g of the copolymer AB-3 obtained in Production Example 3 were placed in a one liter beaker and mixed by a stirring machine operated at 120rpm, to obtain a releasing agent for powder molding as a solution.

50 g of the releasing agent was fed into a coating cup installed on a spray gun (W-7 ® of Iwata Tosoki Kogyo K.K.); the spray gun was connected to one of the air hoses (inside dia : 8 mm) attached to an air compressor (max. air pressure : 10 kg/cm²); a regulator was provided between the spray gun and the air hose; an air pressure of 3 kg/cm² was applied to the spray gun so that the releasing agent in the coating cup could be sprayed from a nozzle of the spray gun by the air pressure.

In a draft was placed an electroformed mold for a glove box of 3.2 mm in thickness, having an impression pattern on the molding surface.

Using the above spray gun apparatus, the releasing agent was sprayed on the molding surface of the electroformed mold to form a thin film thereon. Then, the electroformed mold was surrounded by an iron frame to form a quadrangular prism of 350 mm × 500 mm × 100 mm. The quadrangular prism was set up so that the molding surface of the electroformed mold was directed upward. The upper part of the mold was covered with an iron plate of 2 mm in thickness to protect the molding surface from adhesion of dust, etc.

The thus prepared electroformed mold having a thin film of the releasing agent on the molding surface and surrounded by the iron frame and the iron plate, was placed in a heating furnace maintained at 240°±5° C. to preheat for 20 minutes. The electroformed mold was taken out quickly; the iron plate was removed; 500 g of the above-mentioned material for powder molding was placed in the electroformed mold; the iron plate was again placed on the iron frame quickly; the electroformed mold surrounded by the iron frame and the iron plate was rotated outside of the heating furnace for 30 seconds to allow the material for powder molding to adhere to the molding surface of the electroformed mold. Then, the iron plate was removed and the unmelted excessive material for powder molding was wiped off the electroformed mold; the iron plate was again placed on the electroformed mold; and the quadrangular prism was again placed in the heating furnace. A 5-minute period of heating was effected to completely melt the material for powder molding, adhering to the molding surface of the electroformed mold. Then, the quadrangular prism was taken out of the heating furnace and immersed in cold water to cool the electroformed mold.

After the cooling, the resultant molded article was peeled from the electroformed mold.

According to the process of this Example, as compared with the conventional process comprising spray-coating the same releasing agent as used in Comparative Example 4, it was confirmed that peeling by a small manual force was possible. Further, since the thin film of the copolymer AB-3 was transferred onto the surface of the molded article, the molded article had a surface of good slipperiness and comfortable touch. Furthermore, since the film of the copolymer AB-3 transferred onto the molded article surface was thin, the visual observation of the molded article showed no change in appearance (e.g. color) and the molded article had uniform gloss and uniform impression.

What is claimed is:

1. A process for producing a molded article comprising:

a) coating the surface of a mold with a releasing agent for powder molding which comprises, as an essential component, a copolymer AB derived from at least one monomer A represented by the following general formula (I)

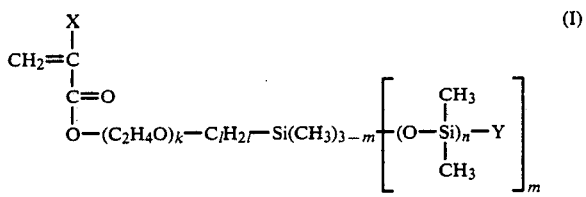

wherein X is a hydrogen atom or a methyl group, k is an integer of 0–5, l is an integer of 1–3, m is a integer of 1–3, n is an integer of 0–550 and Y is a methyl group or a fluorine atom-containing substituent having 1–20 carbon atoms, and at least one vinyl-polymerizable monomer B containing at least one alkyl acrylate or methacrylate wherein the alkyl group has 1–8 carbon atoms;

b) heating the coated mold;

c) allowing a powder of a non-rigid vinyl chloride resin containing a plasticizer to adhere to the heated mold to melt the powder;

d) cooling the mold, releasing agent and powder to form a molded article; and e) peeling the molded article from the mold, monomer A and monomer B being combined in proportions within the copolymer AB such that the film of releasing agent has good compatibility with the vinyl chloride resin and sufficient releasibility from the mold such that the film migrates to the surface of the molded article at the time of peeling.

2. A process for producing a molded article according to claim 1 wherein a repeating unit derived from monomer A is contained in the copolymer AB in an amount of 2–50% by weight.

3. A process for producing a molded article according to claim 1 wherein a repeating unit derived from monomer A is contained in the copolymer AB in an amount of 5 to 35% by weight.

4. A process for producing a molded article according to claim 1 wherein the vinyl monomer B contains at least one alkyl acrylate or alkylmethacrylate whose alkyl group has 1-8 carbon atoms and a repeating unit derived from alkyl acrylate or alkyl methacrylate in the copolymer AB is contained in an amount of 25-98% by weight based on the weight of copolymer AB.

5. A process for producing a molded article according to claim 4 wherein the amount of the repeating unit derived from alkyl acrylate or methacrylate in the copolymer AB is 40-95% by weight.

6. A process for producing a molded article according to claim 2 wherein the vinyl monomer B contains at least one alkyl acrylate or alkyl methacrylate whose alkyl group has 1-8 carbon atoms and a repeating unit derived from alkyl acrylate or alkyl methacrylate in the copolymer AB is contained in an amount of 25-98% by weight based on the weight of copolymer AB.

7. A process for producing a molded article according to claim 6 wherein the amount of the unit derived from alkyl acrylate or methacrylate in the copolymer AB is 40-95% by weight.

8. A process for producing a molded article according to claim 1 wherein n is 1 or more.

9. A process for producing a molded article according to claim 1 wherein X comprises a methyl group.

10. A process for producing a molded article according to claim 1 wherein Y comprises a methyl group.

11. A process for producing a molded article according to claim 9 wherein Y comprises a methyl group.

12. A process for producing a molded article according to claim 1 wherein k is 0.

13. A process for producing a molded article according to claim 1 wherein l is 3.

14. A process for producing a molded article according to claim 1 wherein m is 1.

15. A process for producing a molded article according to claim 1 wherein both X and Y comprise methyl groups, k is 0, l is 3, and m is 1.

16. A process for producing a molded article according to claim 15 wherein n is about 11.

17. A process for producing a molded article according to claim 15 wherein n is about 65.

18. A process for producing a molded article according to claim 15 wherein n is about 132.

19. A process for producing a molded article according to claim 15 wherein n is about 268.

20. A process for producing a molded article according to claim 1 wherein Y comprises a heptafluorophenyl group.

* * * * *